(12) United States Patent
Lawrence et al.

(10) Patent No.: US 9,838,244 B1
(45) Date of Patent: Dec. 5, 2017

(54) COMPOUND ALARMS (71) Applicants: Andrew R. Lawrence, Fort Collins, CO (US); Hugh-John E. Flemming, Fort Collins, CO (US); David L. Ashley, Loveland, CO (US)

(72) Inventors: Andrew R. Lawrence, Fort Collins, CO (US); Hugh-John E. Flemming, Fort Collins, CO (US); David L. Ashley, Loveland, CO (US)

(73) Assignee: CA, Inc., New York, NY (US)

( * ) Notice: Subject to any disclaimer, the term of this patent is extended or adjusted under 35 U.S.C. 154(b) by 75 days.

(21) Appl. No.: 14/103,122

(22) Filed: Dec. 11, 2013

(51) Int. Cl.
*G06F 15/173* (2006.01)
*H04L 12/24* (2006.01)

(52) U.S. Cl.
CPC .................... *H04L 41/06* (2013.01)

(58) Field of Classification Search
CPC ................ H04L 12/26; H04L 12/24
USPC .......................................... 709/224
See application file for complete search history.

(56) References Cited

U.S. PATENT DOCUMENTS

| | | | |
|---|---|---|---|
| 6,182,136 B1 * | 1/2001 | Ramanathan | H04L 29/06 709/202 |
| 6,510,454 B1 | 1/2003 | Walukiewicz | |
| 7,979,245 B1 * | 7/2011 | Bourlatchkov | G06F 11/3409 703/2 |
| 8,041,799 B1 * | 10/2011 | Usery | H04Q 3/0075 709/223 |
| 9,009,185 B2 * | 4/2015 | Bakalov | G06F 11/3006 702/186 |
| 9,118,538 B1 * | 8/2015 | Lekkalapudi | H04L 67/025 |
| 9,529,344 B1 | 12/2016 | Hagins et al. | |
| 2002/0049838 A1 * | 4/2002 | Sylor | H04L 12/2602 709/224 |
| 2002/0184360 A1 | 12/2002 | Weber et al. | |
| 2003/0154271 A1 * | 8/2003 | Baldwin | G06F 3/0601 709/223 |
| 2003/0212769 A1 | 11/2003 | Chaudhry et al. | |
| 2009/0063672 A1 | 3/2009 | Kaminsky et al. | |
| 2012/0123991 A1 * | 5/2012 | Arndt | G06N 5/046 706/50 |
| 2012/0173717 A1 | 7/2012 | Kohli | |
| 2012/0174093 A1 | 7/2012 | Davila et al. | |
| 2012/0297059 A1 | 11/2012 | Bross | |

(Continued)

FOREIGN PATENT DOCUMENTS

WO 2014021834 A1 2/2014

OTHER PUBLICATIONS

U.S. Appl. No. 14/103,328, 30 pages, filed Dec. 11, 2013.

(Continued)

*Primary Examiner* — Vivek Srivastava
*Assistant Examiner* — Hermon Asres
(74) *Attorney, Agent, or Firm* — Baker Botts L.L.P.

(57) ABSTRACT

In accordance with the teachings of the present disclosure, a method of generating a computer alarm is disclosed. The method includes determining a new instance of a characteristic of an element of a computing network to be monitored, identifying a relationship of the element to other elements of the computing network, and automatically creating an alarm threshold for the new instance of the characteristic based upon the relationship of the element to the other elements of the computing network.

15 Claims, 5 Drawing Sheets

(56) References Cited

U.S. PATENT DOCUMENTS

| | | |
|---|---|---|
| 2013/0265910 A1 | 10/2013 | Hillen et al. |
| 2013/0283175 A1* | 10/2013 | Faridian .............. H04L 67/1095 715/736 |
| 2013/0311645 A1 | 11/2013 | Nagami et al. |
| 2014/0282938 A1 | 9/2014 | Moisa |
| 2015/0106504 A1 | 4/2015 | Astigarraga et al. |
| 2015/0201237 A1 | 7/2015 | Seiden et al. |

OTHER PUBLICATIONS

United States Patent and Trademark Office, Non-Final Office Action issued in related U.S. Appl. No. 14/103,328, dated Jul. 16, 2015, 14 pages.
United States Patent and Trademark Office, Office Action issued in related U.S. Appl. No. 14/103,328 dated Jan. 15, 2016.
United States Patent and Trademark Office, Office Action issued in related U.S. Appl. No. 14/103,328 dated May 18, 2016.
United States Patent and Trademark Office, Office Action issued in related U.S. Appl. No. 14/103,328 dated Sep. 27, 2016.
United States Patent and Trademark Office, Office Action issued in related U.S. Appl. No. 14/103,328 dated Feb. 22, 2017.
United States Patent and Trademark Office, Office Action issued in related U.S. Appl. No. 14/103,328 dated Sep. 13, 2017.

* cited by examiner

FIG. 1

TOPOLOGIES

202 TREE : { 202, 204, 206, 208, 210, 212, 214, 216, 218 }
 204 TREE : { 204, 212, 214 }
 208 TREE : { 208, 218 }
 220 TREE : { 220, 222, 224 }

204 PEERS : { 204, 206, 208, 210 }
 212 PEERS : { 212, 214, 216 }
 222 PEERS : { 222, 224 }

212 - 222 CONNECTION : { 212, 204, 202, <120>, 220, 222 }
 212 - 224 CONNECTION : { 212, 204, 202, <120>, 220, 224 }
 214 - 222 CONNECTION : { 214, 204, 202, <120>, 220, 222 }
 218 - 222 CONNECTION : { 218, 208, 202, <120>, 220, 222 }

COMPOUND ALARMS

BACKGROUND

The present disclosure relates generally to information services infrastructure and network management, and more specifically, to automatically generating compound alarms for monitored elements of a computer system. Computer systems may include many elements communicatively coupled to one another via a network. Network and system administrators may manage network elements using various software tools, which may include a graphical user interface.

Application code runs on computer systems. One application may have code running on various elements of a computer system. The application itself may be managed by network or system administrators using various software tools which measure various monitored characteristics of the application itself, as well as the various elements of the computer system on which the application is running.

Traditional graphical user interfaces for software tools used by network and system administrators to monitor elements of a computer system may display data related to various monitored characteristics of the elements. The data related to the monitored characteristics may be displayed in the form of metrics, each of which may represent a measure of a particular monitored characteristic.

BRIEF SUMMARY

According to one aspect of the present disclosure, a method of generating an alarm is disclosed. The method includes determining a new instance of a characteristic of an element of a computing network to be monitored. The method further includes identifying a relationship of the element to other elements of the computing network. Additionally, the method includes automatically creating an alarm threshold for the new instance of the characteristic based upon the relationship of the element to the other elements of the computing network.

According to another aspect of the present disclosure, a computer-readable storage medium, comprising computer-executable instructions carried on the computer readable medium is disclosed. The instructions are readable by a processor and, when read and executed, are configured to cause the processor to determine a new instance of a characteristic of an element of a computing network to be monitored. The instructions are further configured to, when read and executed, cause the processor to identify a relationship of the element to other elements of the computing network. The instructions are also configured to, when read and executed, cause the processor to automatically create an alarm threshold for the new instance of the characteristic based upon the relationship of the element to the other elements of the computing network.

According to yet another aspect of the present disclosure, an apparatus for generating an alarm for a computer system is disclosed. The apparatus includes a processor and a memory communicatively coupled to the processor. The memory includes instructions configured to, when read and executed, cause the processor to determine a new instance of a characteristic of an element of a computing network to be monitored. The instructions are further configured to, when read and executed, cause the processor to identify a relationship of the element to other elements of the computing network. The instructions are also configured to, when read and executed, cause the processor to automatically create an alarm threshold for the new instance of the characteristic based upon the relationship of the element to the other elements of the computing network.

BRIEF DESCRIPTION OF THE DRAWINGS

For a more complete understanding of the configurations of the present disclosure, needs satisfied thereby, and the objects, features, and advantages thereof, reference now is made to the following description taken in connection with the accompanying drawings.

DETAILED DESCRIPTION

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "element," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), a digital versatile disk (DVD), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In accordance with the teachings of the present disclosure, a system may be provided that is configured to monitor a network of computing elements and automatically create a compound alarm condition for one or more of the computing elements. In one embodiment, the compound alarm may be based upon a topology of the computing elements. In another embodiment, the compound alarm may be based upon relationships between the computing elements. Particular embodiments and their advantages are best understood by reference to FIGS. 1 through 4, wherein like numbers are used to indicate like and corresponding parts.

Figure 1:
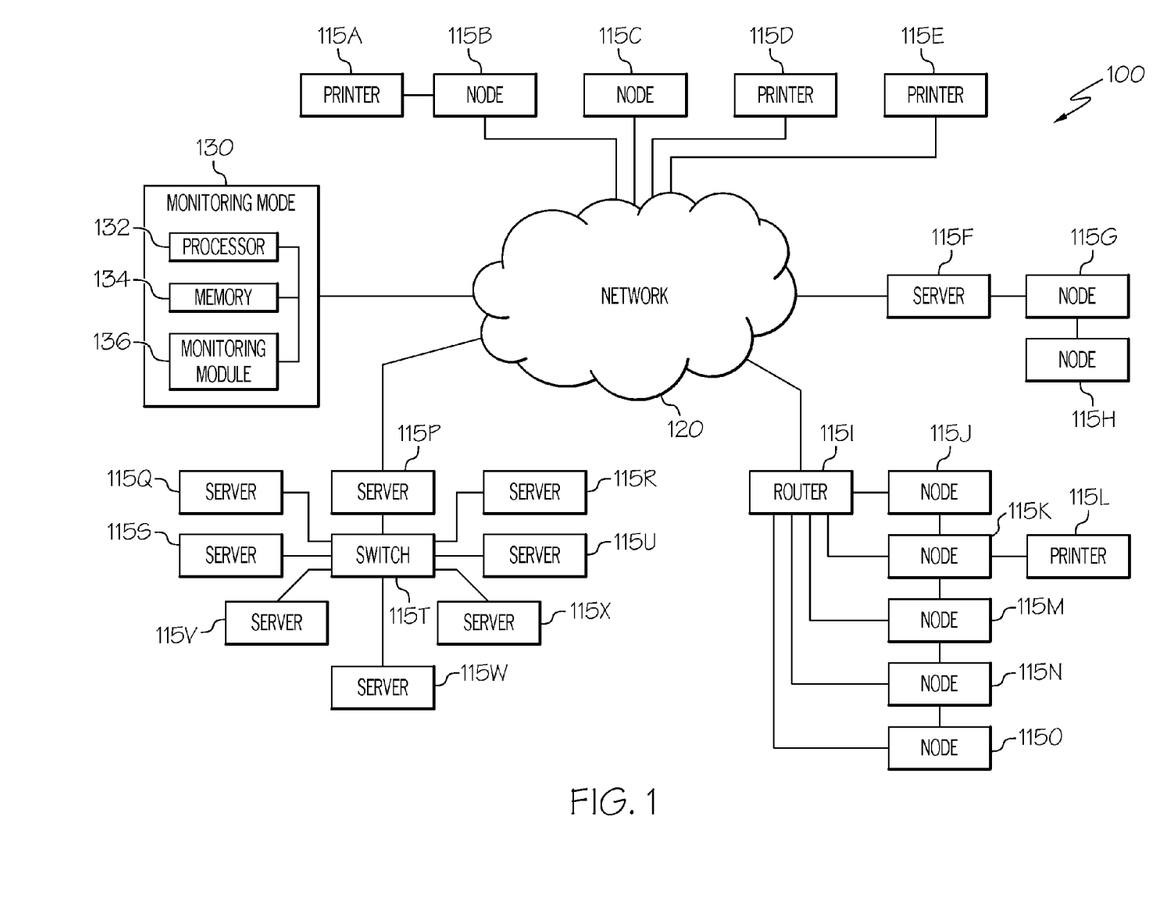
FIG. 1 is a block diagram of an example computer system including monitored elements and a monitoring node, in accordance with the teachings of the present disclosure.

FIG. 1 is a block diagram of an example system 100, which may include a, for example, a plurality of elements 115, a monitoring node 130, and a network 120. Each element 115 may include a physical or logical element communicatively coupled to monitoring node 130 via network 120. For example, each element 115 may include a server (e.g., blade server or rack server), personal computer (e.g., desktop or laptop), tablet computer, mobile device (e.g., personal digital assistant (PDA) or smart phone), network storage device, printer, switch, router, data collection device, virtual machine, script, executable, firmware, library, shared library, function, module, software application, or any other suitable device or application. Although example system 100 is shown in FIG. 1 as including a particular number of elements 115, a system may include more than or fewer than the number of elements 115 illustrated. Similarly, although example system 100 is shown in FIG. 1 as including elements 115 of particular types, a system may include elements 115 of types other than those shown in FIG. 1.

Network 120 may include a network and/or fabric configured to communicatively couple elements 115, monitoring node 130, and/or any element associated with system 100. Network 120 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system configured to facilitate the communication of signals, data and/or messages (generally referred to as data). Network 120 may transmit data using any storage and/or communication protocol, including without limitation, Fibre Channel, Frame Relay, Asynchronous Transfer Mode (ATM), Internet protocol (IP), other packet-based protocol, small computer system interface (SCSI), Internet SCSI (iSCSI), advanced technology attachment (ATA), serial ATA (SATA), advanced technology attachment packet interface (ATAPI), serial storage architecture (SSA), integrated drive electronics (IDE), and/or any combination thereof. Network 120 and its various components may be implemented using hardware, software, or any combination thereof.

Monitoring node 130 may include a processor 132, a memory 134, and a monitoring module 136. Processor 132 may be communicatively coupled to memory 134 and monitoring module 136. Processor 132 may include any system, device, or apparatus operable to interpret and/or execute program instructions and/or process data, and may include without limitation a microprocessor, a microcontroller, a digital signal processor (DSP), an application specific integrated circuit (ASIC), or any other digital or analog circuitry configured to interpret and/or execute program instructions and/or process data.

Memory 134 may be configured in part or whole as application memory, system memory, or both. Memory 134 may include any system, device, or apparatus configured to hold and/or house one or more memory modules. Each memory module may include any system, device or apparatus configured to retain program instructions and/or data for a period of time (e.g., computer-readable storage media).

Monitoring module 136 may include computer-program instructions resident in memory 134 (or another computer-readable medium communicatively coupled to monitoring node 130) and capable of being executed by processor 132. Monitoring module 136 may be configured to monitor various characteristics of elements 115. Such characteristics may include, but are not limited to, utilization, response time, performance, throughput, transaction count, and other characteristics related to usage and/or performance of elements 115. Monitoring module 136 may be configured to collect data related to various metrics. Each metric may represent a measure of a particular monitored characteristic. Where a single characteristic is referenced, it may be understood that multiple characteristics may be monitored and/or utilized. Data related to a particular metric may include values representing a measure of the particular monitored characteristic. In some embodiments, the data collected by monitoring module 136 may be stored in memory 134. In other embodiments, the data collected by monitoring module 136 may be stored in storage 140.

Storage 140 may include a database, directory, or other data structure operable to store data. Further, storage 140 may include any instrumentality or aggregation of instrumentalities that may retain data and/or instructions for a period of time. Storage 140 may include random access memory (RAM), electrically erasable programmable read-only memory (EEPROM), a Personal Computer Memory Card International Association (PCMCIA) card, flash memory, solid state disks, hard disk drives, magnetic tape libraries, optical disk drives, magneto-optical disk drives, compact disk drives, compact disk arrays, disk array controllers, and/or any suitable selection or array of volatile or non-volatile memory operable to store data.

Monitoring node 130 may be implemented in any suitable portion of system 100. Although monitoring node 130 is illustrated as a node separate from elements 115, in various embodiments monitoring node 130 may be implemented in one of elements 115. Furthermore, in various other embodiments, multiple instances of monitoring node 130 may be implemented in various ones of elements 115.

Monitoring module 136 may be configured to actively and/or passively monitor elements 115. For example, monitoring module 136 may actively monitor a particular element 115 by querying element 115 for specific information and/or measuring the time it takes element 115 to respond to queries. Monitoring module 136 may passively monitor a particular element 115 by, for example, accessing and analyzing an error log, or other performance related log maintained by an element 115 or another component of system 100. Furthermore, monitoring module 136 may monitor elements 115 by sniffing or evaluating data as it is passed through an instance of monitoring module 136.

In accordance with the teachings of the present disclosure, monitoring node 130 may be configured to analyze data collected by monitoring module 136 and trigger an alarm if data related to a monitored characteristic of one or more elements 115 or indicates a problem, issue, or condition. The thresholds for the characteristics may be defined by monitoring module 136 and may be applied based on the type of characteristic. Furthermore, the thresholds may be applied automatically to a newly detected element 115 or connection thereof. Thus, the thresholds may be applied automatically to a new source of a demand for a resource. The thresholds may include a default value to be applied automatically. For example, given a connection between element 115Q and element 115U, monitoring module 136 may be configured to set an alarm if the bandwidth utilization between elements 115Q and 115U reaches a threshold of 95%. In another example, given an available shared service operating on element 115X, monitoring module 136 may be configured to set an alarm to any other element 115 connecting to element 115X such that the alarm is triggered if a given one of such elements connecting to element 115X utilizes greater than 25% of the available service.

An alarm may be implemented in any suitable manner. For example, an alarm may be implemented as a notation in a database, record or file; as an electronic communication to a user of system 100 or monitoring module 136; as an electronic communication to another portion of system 100 for handling; or as a visual or audible indicator within a monitoring program. An alarm may be a compound alarm by, for example, inclusion of thresholds for multiple characteristics; thresholds for characteristics on multiple elements; or logical or predicate bases for characteristic thresholds.

An alarm may be based upon any suitable threshold, binary determination, trend, or pattern in data related to a monitored characteristic. For example, an alarm may include thresholds that identify deviations from known safe usage trends and/or patterns. An alarm may be based upon underutilization or overutilization of a resource, node, element, or service of system 100. Furthermore, an alarm may be based upon determined activity associated with malware or electronic intrusion.

In one embodiment, an alarm may be based upon multiple monitored characteristics. For example, a high transaction count for an element 115 processing network transactions may not violate a threshold and thus not trigger an alarm. However, the combination of a transaction count exceeding a threshold with a low response time below another threshold for the particular element 115 may trigger an alarm. In another embodiment, an alarm may be based upon a monitored characteristic from two or more elements 115. For example, an alarm may be triggered when two peer nodes both exceed utilization rates of 90% for a threshold period of time, whereas a single such node exceeding the utilization rate would not trigger the alarm.

An alarm for one or more elements 115 may be automatically created based upon the relationship with other elements 115. Such relationships may be expressed by, for example, the topology of network 100 with respect to elements 115 or by a connection between any given elements 115. Furthermore, the automatically created alarm may be based upon monitored characteristics of element 115.

Figure 2:
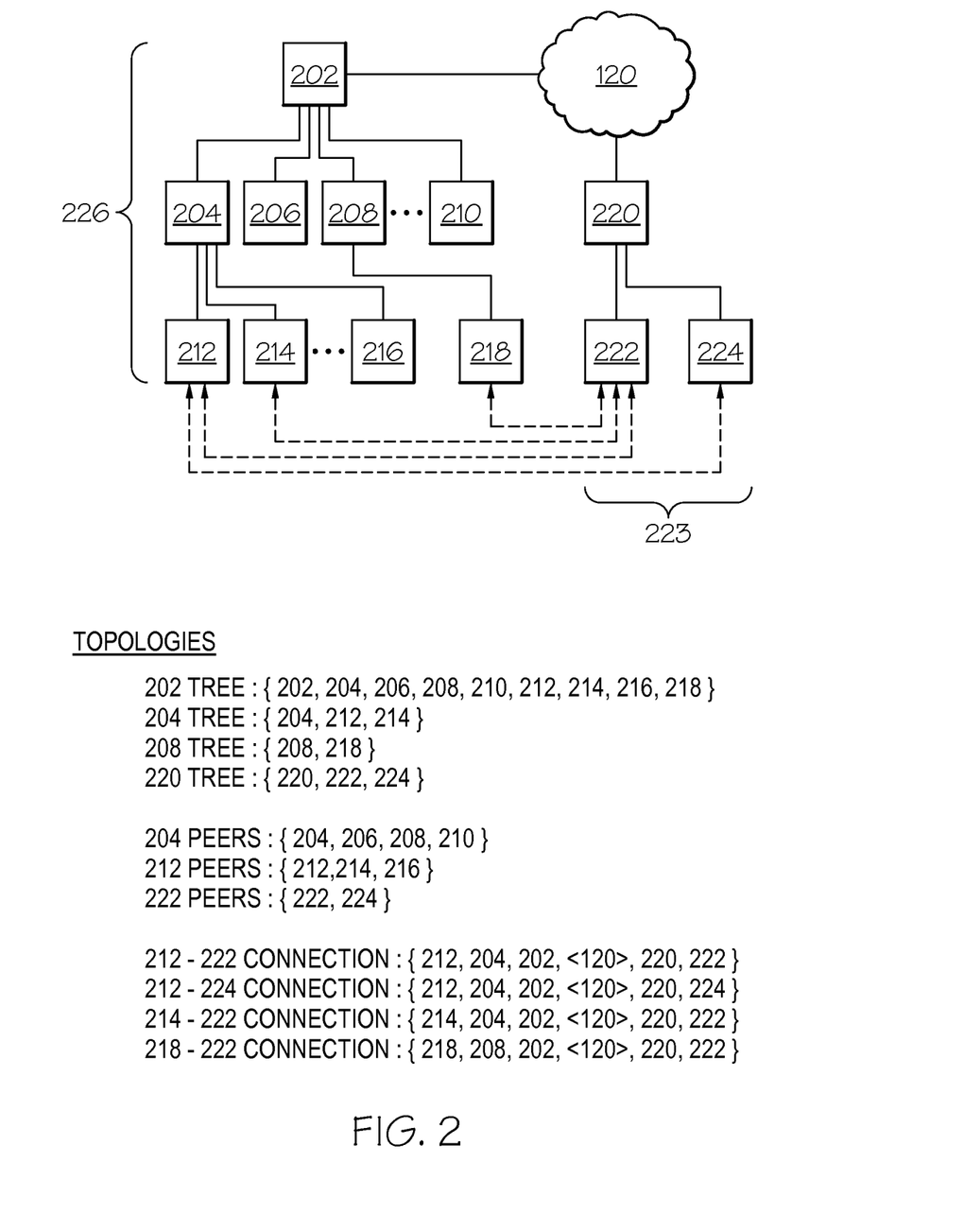
FIG. 2 is an example graph of topologies of elements for which an alarm may be automatically created, in accordance with the teaching of the present disclosure.

FIG. 2 is an example graph 200 of topologies of elements 115 for which an alarm may be automatically created, in accordance with the teachings of the present disclosure. Graph 200 illustrates various elements 202, 204, 206, 208, 210, 212, 214, 216, 218, 220, 222, 224, each of which may be implemented by any suitable one of elements 115 illustrated in FIG. 1. Although a particular number and arrangement of elements is illustrated in FIG. 2, any suitable number, combination, arrangement, or topology of elements may be used. Such topologies may be physical or virtual.

One or more elements in graph 200 may be arranged in a subnetwork 226. For example, elements 202, 204, 206, 208, 210, 212, 214, 216, and 218 may be arranged in subnetwork 226. One or more elements in graph 200 may be arranged in a subnetwork 228. For example, elements 220, 222, and 224 may be arranged in subnetwork 228.

The elements of subnetworks 226, 228 may be arranged in any suitable manner. For example, subnetworks 226, 228 may be implemented as a tree hierarchy, loop, ring, bus, star, point-to-point, mesh, or daisy-chain. In the example of FIG. 2, subnetwork 226 may be implemented as a tree hierarchy, with element 202 as the root node of the hierarchy. Element 202 may have any suitable number and kind of children, such as elements 204, 206, 208, 210. Furthermore, elements 204, 206, 208, 210 may have any suitable number and kind of children. For example, element 204 may have child elements 212, 214, 216 and element 208 may have element child 218. In another example, element 208 may have child element 218.

Furthermore, in the example of FIG. 2, subnetwork 228 may be implemented as a tree hierarchy, with element 220 as the root node of the hierarchy. Element 220 may have any suitable number and kind of children, such as elements 222 and 224.

Any suitable number and kind of topologies and relationships may exist between any given two elements in graph 200. For example, the tree hierarchy of element 202 may include elements 202, 204, 206, 208, 210, 212, 214, 216, 218. The tree hierarchy of element 204 in turn may include elements 204, 212, 214. The tree hierarchy of element 208 may include elements 208, 218. The tree hierarchy of element 220 may include elements 220, 222, 224.

In another example, element 204 may have peer elements such as elements 206, 208, 210. These elements in turn may have each other and element 204 as peers, forming a peer group. Element 212 may have elements 214 and 216, which in turn may have each other and element 204 as peers, forming a peer group. Element 222 may have element 224 as a peer, and vice-versa, forming a peer group.

In yet another example, various elements in FIG. 2 may form electronic communication connections with each other. Such connections may include, for example, utilization by one element of a resource on another element. In another example, such connections may include data transfer from one element to another. In the example of FIG. 2, connections may exist between elements 212 and 222, spanning elements 212, 204, 202, 220, 222 and network 120. Connections may exist between elements 212 and 224, spanning elements 212, 204, 202, 220, 224, and network 120. Connections may exist between elements 214 and 222, spanning elements 214, 204, 202, 220, 222 and network 120. Furthermore, connections may exist between elements 218 and 222, spanning elements 218, 208, 202, 220, 222 and network 120.

Each of elements 202, 204, 206, 208, 210, 212, 214, 216, 218, 220, 222, 224 may be associated with one or more monitored characteristics. The characteristics monitored for each of elements 202, 204, 206, 208, 210, 212, 214, 216, 218, 220, 222, 224 may include the same or different characteristics. In one embodiment, all elements of a given topology or connection may share a common group of monitored characteristics. A given topology or connection may establish monitored characteristics by default according to, for example, settings for a topology or by the type of connection.

Monitoring module 136 may be configured to automatically create an alarm for one or more of the elements illustrated in FIG. 2 based upon the relationship of a given element with other elements. In one embodiment, monitoring module 136 may be configured to automatically create an alarm for an element based upon a topology associated with the given element. In a further embodiment, other alarms may be automatically created or modified for other elements related to the given element within the topology. In another embodiment, monitoring module 136 may be configured to automatically create an alarm based upon a connection from a given element to another element. In a further embodiment, other alarms may be automatically created or modified for other elements that are associated with the connection or of the same topology of the given element.

Monitoring module 136 may be configured to automatically create an alarm for an element at any suitable time. In one embodiment, monitoring module 136 may be configured to automatically create an alarm as an element is added to a topology. In another embodiment, monitoring module 136 may be configured to automatically create an alarm as an element establishes a connection to another element.

Figure 3A:
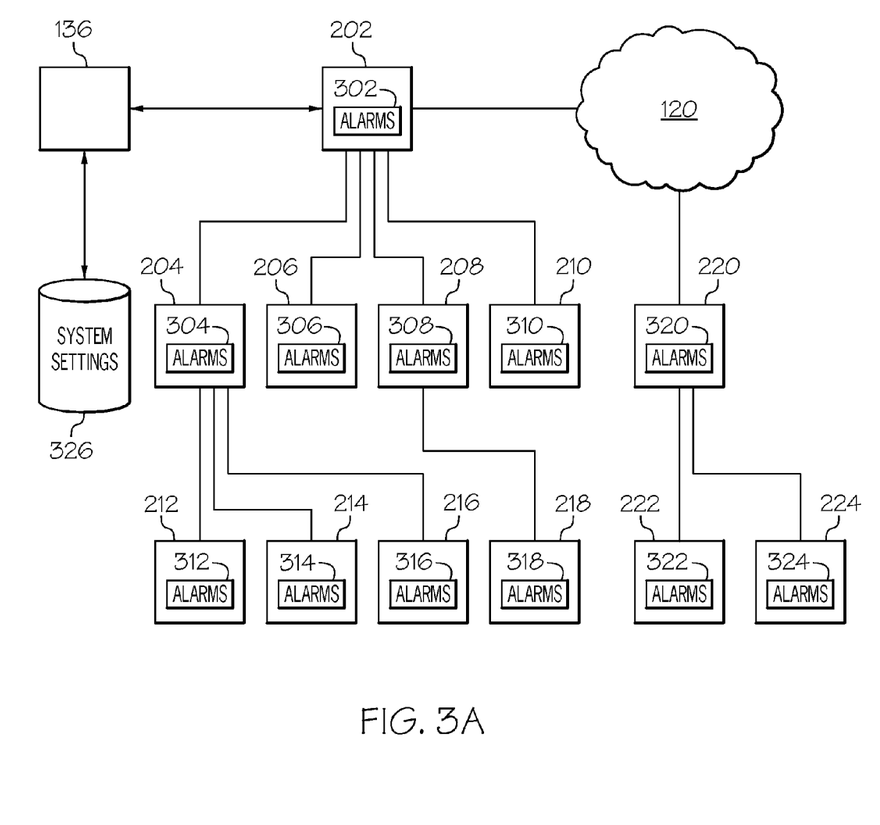
FIGS. 3A and 3B illustrate example operation of a system for automatically generating alarms, in accordance with the teachings of the present disclosure.
Figure 3B:
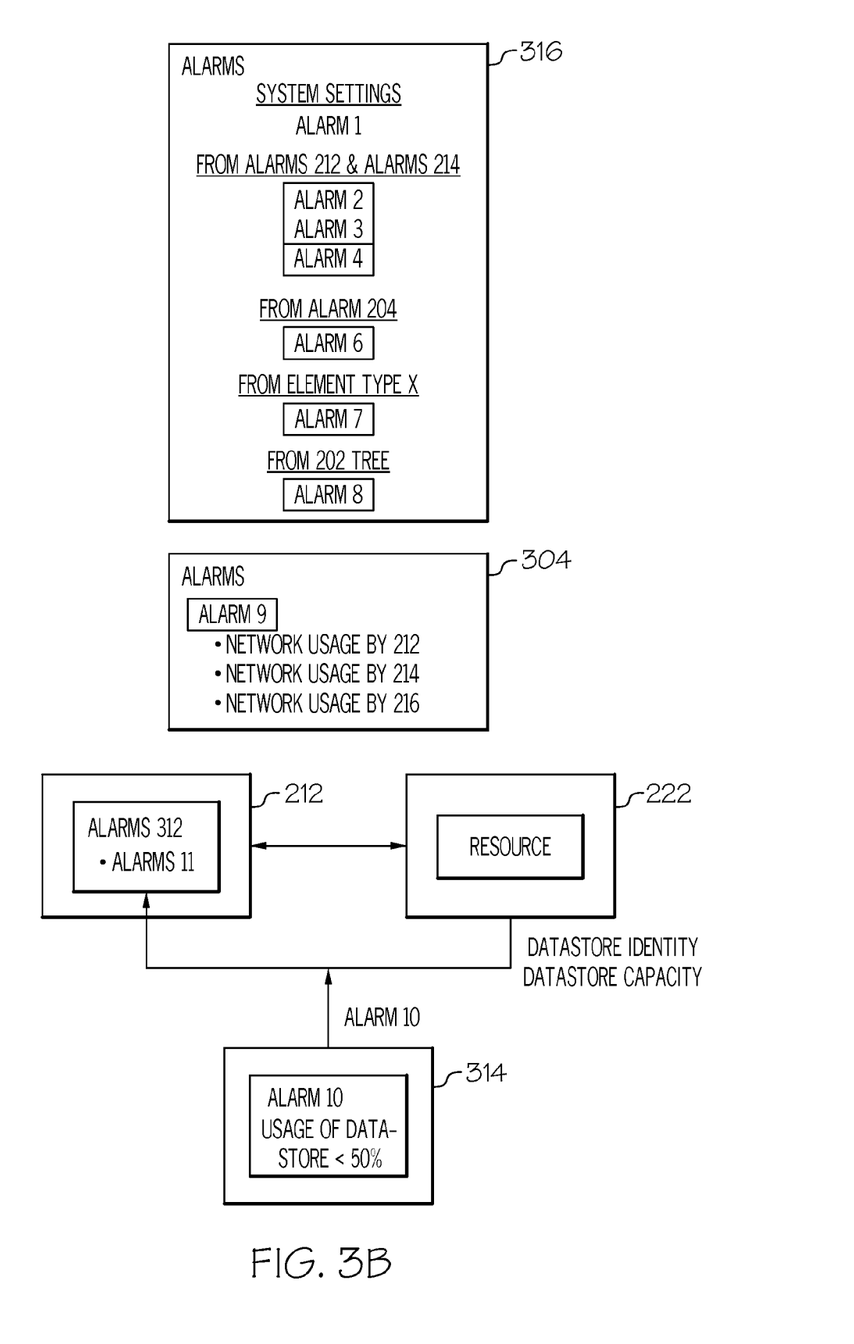

FIGS. 3A and 3B illustrate example operation of system 100 for automatically generating alarms for elements of graph 200, in accordance with the teachings of the present disclosure. In the example of FIGS. 3A and 3B, each element may be associated with a definition of one or more associated alarms. For example, element 202 may include alarms 302. Although alarms such as alarms 302 are illustrated as resident within respective elements, such alarms may be stored in any suitable portion of system 100. For example, all alarms may be stored with the associated probe such as monitoring module 136.

Monitoring module 136 may determine that, for example, element 216 has been added to tree hierarchy 226. Monitoring module 136 may determine the location of element 216 and its peers. Based on such a determination, monitoring module 136 may automatically generate one or more alarms for element 216. The alarm may be based upon resources of system 100 for which element 216 has access. To determine what alarm or alarms are to be generated, monitoring module 136 may use any suitable mechanism.

In one embodiment, monitoring module 136 may access system settings 326 to determine how to define alarms for element 216. System settings 326 may specify default thresholds for resources accessed or used by element 216. For example, system settings 326 may specify that an instance of Alarm1 is to be populated into the alarms of any newly created element such as element 216, wherein Alarm1 specifies that an alarm is to be triggered if processor utilization of element 216 exceeds ninety percent for longer than thirty minutes. This alarm may be added to alarms 316. In another example, system settings 126 may specify that elements of a given type will be automatically created with a specified alarm. Thus, if element 216 is of a type X, then monitoring module 136 may automatically create Alarm7 for element 216. This alarm may be added to alarms 316. Furthermore, system settings 326 may specify how or which other alarms may be replicated or reproduced to automatically create alarms for element 216. System settings 326 may be specified by a user or administrator of system 100. Furthermore, system settings 326 may be specified by another portion of system 100. System settings 326 may be stored in, for example, a file, database, record, or other suitable structure.

In another embodiment, monitoring module 136 may determine alarms for element 216 based upon elements in the peer group of element 216. Monitoring module 136 may traverse the hierarchy to determine the elements of the peer group. For example, monitoring module 136 may automatically create alarms for element 216 based upon existing alarms in elements 212 and 214. These alarms may be added to alarms 316. In a further embodiment, monitoring module 136 may determine all applicable alarms from elements 212, 214 and automatically create equivalent alarms for element 216. For example, monitoring module 136 may determine that Alarm2, Alarm3, Alarm4, and Alarm5 are all alarms within the peer group of element 216 and automatically create new instances of these for element 216. In another, further embodiment, monitoring module 136 may determine what alarms are common to elements in the peer group. For example, monitoring module 136 may determine that Alarm2 and Alarm3 are common to elements 212, 214 and automatically create new instances of these for element 216. These alarms may be added to alarms 316.

In yet another embodiment, monitoring module 136 may determine alarms for element 216 based upon the hierarchy in which element 216 is present. For Monitoring module 136 may first traverse the hierarchy to determine the elements for which element 216 is a child. For example, monitoring module 136 may automatically create alarms for element 216 based upon alarms specified by element 202 as alarms for the entire tree hierarchy. Thus, monitoring module 136 may automatically create an instance of Alarm8 for element 216. This alarm may be added to alarms 316. In another example, element 216 may inherit alarms from the element from which element 216 depends in the hierarchy. Thus, monitoring module 136 may automatically create an instance of Alarm6 for element 216, as element 216 is a child of element 204. This alarm may be added to alarms 316.

In various embodiments, any suitable number or kind of existing alarms may be updated or modified based upon the addition of an element. For example, the addition of element 216 may cause modifications to alarms in the peer group of element 216 or in parent or grandparent elements. In another example, the addition of element 216 may cause modifications to alarms in any other element accessing or sharing common resources with element 216.

In the example of FIG. 2, a set of alarms 304 associated with element 204, the parent element of the newly added element 216, may be updated based upon the addition of element 216. Alarms 304 may specify Alarm9 which includes monitoring network usage by child elements of element 204 such that, for example, network usage does not exceed a specified threshold. Alarm9 may already include considerations of network usage by elements 212, 214. Upon the addition of element 216, monitoring module 136 may automatically modify alarms 304 to add an additional condition that network usage by element 216 is not to exceed the specified threshold.

Monitoring module 136 may determine that, for example, element 212 has formed a connection to another element, such as element 222. The connection may include a use of a resource of the other element. For example, a virtual machine running on or through element 212 may access a datastore of element 222. Monitoring module 136 may traverse the connection to determine related portions of system 100, such as elements 204, 202, network 120, elements 220, 222. The alarms of each such element may be modified as necessary. Furthermore, monitoring module 136 may determine whether any other elements are accessing the shared resource. In response, monitoring module 136 may add conditions associated with element 212's usage to existing alarms of related elements. Once monitoring module 136 has determined the destination identity, monitoring module 136 may determine the resource capacity. In one embodiment, monitoring module 136 may determine whether any other alarms exist with respect to the resource. For example, monitoring module 136 may determine that element 214 also access element 222, or at least has an alarm related to usage of element 222 and its datastore. Alarms 314 may include Alarm10 with a threshold of fifty-percent usage of element 222. Given the determined capacity of element 222 and/or the determined existing alarm, monitoring module 136 may automatically create Alarm11 for use by element 212 in its alarms 312.

Figure 4:
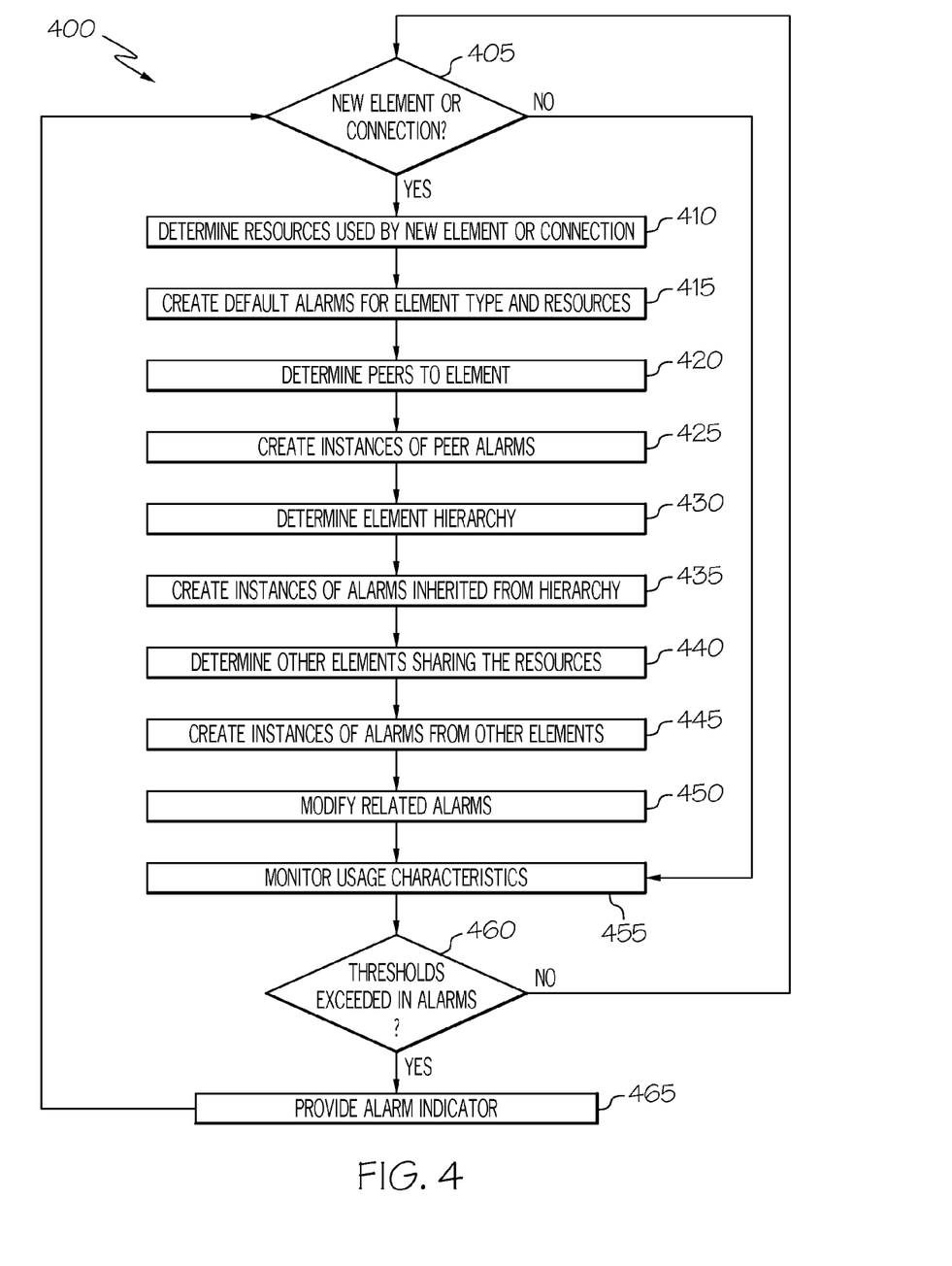
FIG. 4 is a flowchart of an example method for automatically creating alarms, in accordance with the teachings of the present disclosure.

FIG. 4 is a flowchart of an example method 400 for automatically creating alarms, in accordance with the teachings of the present disclosure. Although FIG. 4 discloses a particular number of steps to be taken with respect to example method 400, method 400 may be executed with more or fewer steps than those depicted in FIG. 4. In addition, although FIG. 4 discloses a certain order of steps to be taken with respect to method 400, the steps of these methods may be completed in any suitable order. Method 400 may be implemented using the system of FIGS. 1-3 or any other suitable mechanism. In certain embodiments, method 400 may be implemented partially or fully in software embodied in computer-readable storage media.

Program instructions may be used to cause a general-purpose or special-purpose processing system that is programmed with the instructions to perform the operations described below. The operations may be performed by specific hardware components that contain hardwired logic for performing the operations, or by any combination of programmed computer components and custom hardware components. Method 400 may be provided as a computer program product that may include one or more machine readable media having stored thereon instructions that may be used to program a processing system or other electronic device to perform the methods.

In some embodiments, method 400 may begin at 405. At 405, the monitoring module of a monitoring node (such as shown in FIG. 1) may determine whether a new element has been introduced into a system, or whether a new connection of resource usage has been made between elements. As discussed above with respect to FIG. 1, each element may include a server (e.g., blade server or rack server), personal computer (e.g., desktop or laptop), tablet computer, mobile device (e.g., personal digital assistant (PDA) or smart phone), network storage device, printer, switch, router, data collection device, virtual machine, script, executable, firmware, library, shared library, function, module, software application, or any other suitable device or application. The particular characteristics of each element that may be monitored may, for example, be determined and set by system preferences. The monitoring module may be configured to actively and/or passively monitor various characteristics of each element and collect data related to various metrics, each of which may represent a measure of a particular monitored characteristic. In some embodiments, the monitoring module may be configured to collect data related to the monitored characteristics of each element at particular time intervals and the data collected by the monitoring module may be stored in the memory of the monitoring node.

If a new element or connection has been determined, method 400 may proceed to 410. If a new element or connection has not been determined, method 400 may proceed to 455.

At 410, the monitoring node may determine what resource are used by the new element or involved in the new connection. The resources may dictate what kinds of thresholds and alarms may be used to monitor the usage of such resources. At 415, default alarms based upon the resources may be automatically generated. The default alarms may include default threshold values. Furthermore, such defaults may be based on the type of element. The default alarms may be specified according to system preferences.

At 420, peers to a newly added element may be determined by the monitoring node. The peers may include other elements with one or more parent or grandparent nodes in common with the newly added element. At 425, new instances of alarms present in the peer elements may be created for the newly added element. The alarms may be added based upon, for example, presence of the alarm in each or any element in the peer group.

At 430, the hierarchy of elements associated with the newly added element may be determined by the monitoring node. The hierarchy may include parent nodes of the newly added element. At 435, new instances of alarms from parent nodes may be automatically created for the newly added element. For example, the newly added element may inherit alarms from its parent node. In another example, the newly added element may inherit alarms from the root node of its hierarchy.

At 440, the monitoring node may determine what other elements of the system are using the resources used by the newly added element, or are also using the resources associated with the newly formed connection. At 445, new instances of alarms from such other elements may be automatically created for the newly added element or for the element establishing the connection. At 450, the alarms of other elements associated with the newly formed connection or added element may be modified or adjusted by the monitoring node. Such alarms may take into account the demands of the new connection or element.

At 455, the monitoring node may monitor usage of shared resources in the system. Such monitoring may be active or passive. At 460, the monitoring node may determine whether or not any defined alarms have been triggered by, for example, resource usage exceeding a threshold amount. If no alarms have been triggered, method 400 may proceed to 405. If an alarm has been triggered, method 400 may proceed to 465. At 465, the monitoring node may provide a suitable indication that the identified alarm has been triggered. Such an indication may be provided, for example, in software, audibly, or through another electronic communication. Method 400 may terminate or may repeat by proceeding to 405.

The flowchart and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method of generating a computing alarm, comprising:
    determining whether a new instance of an element has been added to a computing network, wherein the computing network comprises a plurality of elements and the computing network is to be monitored, wherein the element comprises a physical or logical element communicatively coupled to a monitoring node via the computing network and wherein the new instance of the element comprises a new connection of the element to a resource of the computing network;
    determining a hierarchical position of the new instance of the element within a network topology;
    creating alarm thresholds for the new instance of the element that are inherited from parent nodes of the new instance of the element, wherein the alarm thresholds are based upon another element sharing access to the resource associated with the new connection;
    determining identities of peer elements of the new instance of the element, wherein a peer element has one or more parent or grandparent nodes in common with the new instance of the element;
    determining identities of other elements of the system that are using the resource associated with the new connection;
    determining existing alarms of the peer elements of the new instance of the element;
    modifying alarms of the other elements using the resource associated with the new connection to take into account demands of the new connection; and
    automatically creating alarm thresholds for the new instance of the element that are equivalent to the existing alarms of the peer elements,
    wherein the alarm thresholds are usable to:
    monitor a characteristic of the elements in the computing network;
    compare the monitored characteristic to the alarm thresholds; and
    in response to determining the monitored characteristic exceeds the alarm thresholds, provide an indication that an alarm has been triggered.

2. The method of claim 1, wherein the new instance of the element comprises adding the element to a portion of the computing network.

3. The method of claim 1, further comprising automatically updating another alarm threshold based upon the automatic creation of the alarm threshold.

4. The method of claim 1, wherein modifying alarms of the other elements using the resource associated with the new connection to take into account demands of the new connection comprises
adding a condition associated with usage of the new instance of the element to existing
alarms of the other elements, and
wherein the method further comprises determining capacity of the shared resource.

5. A non-transitory computer-readable storage medium, comprising computer-executable instructions carried on the non-transitory computer readable medium, the instructions readable by a processor and, when read and executed, configured to cause the processor to:
determine whether a new instance of an element has been added to a computing network, wherein the computing network comprises a plurality of elements and the computing network is to be monitored, wherein the element comprises a physical or logical element communicatively coupled to a monitoring node via the computing network and wherein the new instance of the element results from a new connection of the element to a resource of the computing network;
determine a hierarchical position of the new instance of the element within a network topology;
create alarm thresholds for the new instance of the element that are inherited from parent nodes of the new instance of the element, wherein the alarm thresholds are based upon another element sharing access to the resource associated with the new connection;
determine identities of peer elements of the new instance of the element, wherein a peer element has one or more parent or grandparent nodes in common with the new instance of the element;
determine identities of other elements of the system that are using the resource associated with the new connection;
determine existing alarms of the peer elements of the new instance of the element;
modify alarms of the other elements using the resource associated with the new connection to take into account demands of the new connection;
automatically create alarm thresholds for the new instance of the element that are equivalent to the existing alarms of the peer elements;
monitor a characteristic of the elements in the computing network;
compare the monitored characteristic to the alarm thresholds; and
in response to determining the monitored characteristic exceeds the alarm thresholds, provide an indication that an alarm has been triggered.

6. The medium of claim 5, wherein the new instance of the element results from adding the element to a portion of the computing network.

7. The medium of claim 5, further comprising instructions for causing the processor to automatically update another alarm threshold based upon the automatic creation of the alarm threshold, wherein the another alarm threshold comprises an alarm threshold of a peer group of elements or a parent or a grandparent element of the element.

8. The medium of claim 5, wherein automatically creating the alarm threshold is further based on a position of the element within a network topology.

9. The medium of claim 5, further comprising instructions for causing the processor to determine a capacity of the shared resource, and
wherein modifying alarms of the other elements using the resource associated with the new connection to take into account demands of the new connection comprises adding a condition associated with usage of the new instance of the element to existing alarms of the other elements.

10. An apparatus for generating an alarm in a computer system, the apparatus comprising:
a processor; and
a memory communicatively coupled to the processor, the memory comprising instructions operable, when executed by the processor, to cause the processor to:
determine whether a new instance of an element has been added to a computing network, wherein the computing network comprises a plurality of elements and the computing network is to be monitored, wherein the element comprises a physical or logical element communicatively coupled to a monitoring node via the computing network, and wherein the new instance of the element results from a new connection of the element to a resource of the computing network;
determine a hierarchical position of the new instance of the element within a network topology;
create alarm thresholds for the new instance of the element that are inherited from parent nodes of the new instance of the element, wherein the alarm thresholds are based upon another element sharing access to the resource associated with the new connection;
determine identities of peer elements of the new instance of the element, wherein a peer element has one or more parent or grandparent nodes in common with the new instance of the element;
determine identities of other elements of the system that are using the resource associated with the new connection;
determine existing alarms of the peer elements of the new instance of the element;
modify alarms of the other elements using the resource associated with the new connection to take into account demands of the new connection;
automatically create alarm thresholds for the new instance of the element that are equivalent to the existing alarms of the peer elements;
monitor a characteristic of the elements in the computing network;
compare the monitored characteristic to the alarm thresholds; and
in response to determining the monitored characteristic exceeds the alarm thresholds, provide an indication that an alarm has been triggered.

11. The apparatus of claim 10, further comprising instructions for causing the processor to determine a capacity of the shared resource, and
wherein modifying alarms of the other elements using the resource associated with the new connection to take into account demands of the new connection further comprises instructions for causing the processor to add a condition associated with usage of the new instance of the element to existing alarms of the other elements.

12. The apparatus of claim 10, wherein the memory further comprises instructions for causing the processor to automatically update another alarm threshold based upon the automatic creation of the alarm threshold.

13. The apparatus of claim 10, wherein automatically creating the alarm threshold is further based on a position of the element within a network topology.

14. The apparatus of claim 10, wherein another element sharing access to the resource with the element has a different parent element.

15. The method of claim 1, wherein the monitored characteristic comprises shared resource usage of the elements within the computing network and the alarm threshold is triggered by the resource usage exceeding the alarm thresholds.

* * * * *